United States Patent [19]

Bishop et al.

[11] Patent Number: 5,570,343
[45] Date of Patent: Oct. 29, 1996

[54] COMMUNICATIONS SYSTEM

[75] Inventors: Peter W. D. Bishop, Swindon; Ian M. Bartlett, Marlborough, both of Great Britain

[73] Assignee: Motorola, Inc., Schaumburg, Ill.

[21] Appl. No.: 281,376

[22] Filed: Jul. 27, 1994

[30] Foreign Application Priority Data

Jul. 31, 1993 [GB] United Kingdom ............... 9315899

[51] Int. Cl.$^6$ ............. H04B 7/212; H04B 17/00
[52] U.S. Cl. ............. 370/16; 370/95.3; 379/60; 455/8; 455/33.2; 455/56.1
[58] Field of Search ............. 370/13, 16, 95.1, 370/95.3; 455/33.1, 33.2, 56.1, 33.4, 8, 9, 67.1, 69, 116; 379/59, 60, 63; 371/48

[56] References Cited

U.S. PATENT DOCUMENTS

| | | |
|---|---|---|
| 4,435,840 | 3/1984 | Kojima et al. ............... 455/33 |
| 4,670,899 | 6/1987 | Brody et al. ............... 455/33 |
| 5,265,150 | 11/1993 | Helmakamp et al. ............... 455/56.1 |
| 5,276,907 | 1/1994 | Meidan ............... 455/56.1 |
| 5,295,180 | 3/1994 | Vendetti et al. ............... 455/33.1 |
| 5,428,817 | 6/1995 | Yahagi ............... 455/33.1 |
| 5,448,621 | 9/1995 | Knudsen ............... 370/95.3 |
| 5,465,399 | 11/1995 | Oberholtzer et al. ............... 455/67.1 |
| 5,485,486 | 1/1996 | Gilhousen et al. ............... 455/33.1 |

Primary Examiner—Benedict V. Safourek
Assistant Examiner—Seema S. Rao
Attorney, Agent, or Firm—Richard A. Sonnentag; Raymond J. Warren

[57] ABSTRACT

In order to mitigate problems caused by total or partial failure of a number of sectorised radio channel unit transceivers (RCU) in a base station of a particular cell (16) of a radio communications system, base stations (26, 32) in adjacent cells (14, 20) increase the power transmitted from RCUs controlling sectors adjacent to that particular cell 16, thereby filling the gap in coverage left by the failure of that cell (16).

7 Claims, 5 Drawing Sheets

10

—PRIOR ART—

— PRIOR ART —

— PRIOR ART —

COMMUNICATIONS SYSTEM

BACKGROUND OF THE INVENTION

This invention relates, in general, to communications systems and is particularly, but not exclusively, applicable to operational control of communication systems, such as a cellular communications system.

SUMMARY OF THE PRIOR ART

Cellular communication system operators place stringent requirements on the reliability of the cellular infrastructure equipment in order to maximise system availability to users of the communication system and to maximise revenues for the operator. A system operator may therefore expect a typical mean time between failures (MTBF) for equipment required to process a complete voice channel, i.e. all equipment between the switch (the connection to a public switched telephone network) and a mobile communications device in a cell, to be 5 years or more. As will be appreciated, a modern communications system contains many modules and components. Indeed, the shear quantity of elements in, for example, a base station of a cellular communications system, demands a reliability level for each component that stretches the limits of present manufacturing technologies. If we consider a time division multiple access (TDMA) system, such as the pan-European GSM cellular communications system, the demands on the reliability requirement are compounded because each element in, say, the base station handles several voice channels simultaneously. Hence, to retain the same voice channel reliability, a module MTBF needs to be improved in proportion to the total number of channels carried.

At present, reliability standards demanded by cellular operators are achieved through the use of component duplication, i.e. component redundancy. More specifically, in the event of failure of a first circuit, a second identical circuit is automatically switched into the system, thereby allowing continual operation. It will be appreciated that, at this time, an alert may be generated to inform the cellular operator that a failure has occurred and that maintenance is therefore required. The provision of redundant components adds significantly to the cost and complexity of the communication system infrastructure. Typically, redundant equipment in a cellular communications system will comprise a radio module, a digital controller for that module and a link back to the switching centre that facilitates coupling of the redundant system to transmit and receive antennae.

When a failure is detected, a system operator or control software located inside the failed piece of equipment, switches the redundant equipment into use with a minimal break in service.

With the increasing trends towards the use of more short range, low capacity cells ("micro-cells"), where a system capacity of, perhaps, only one radio is required, the provision of such redundant equipment has significant cost implications.

Clearly there is a requirement in the art to provide a communications system that mitigates some of the aforementioned cost and component redundancy requirements.

SUMMARY OF THE INVENTION

In accordance with the present invention, there is provided a communications system for communications coverage over a coverage area comprising a plurality of interconnected cells, the system comprising: a controller; a first transmitter for transmitting information into a first cell in response to the controller; and a fault detection circuit, responsive to the first transmitter and coupled to the controller, for detecting a fault in the first transmitter and for generating a fault signal, in response to the detection of a fault, that indicates that the cell has suffered failure in communications coverage; wherein the controller, in response to a fault signal generated by a fault detection circuit associated with the first cell, instructs a variable power second transmitter located in an adjacent cell to increase its output power, thereby extending its coverage range and providing, at least in part, communications coverage to the cell suffering failure.

In a preferred embodiment, the communications system may further comprise a receiver, coupled to the controller, for relaying communications signals from a communications device, responsive to said information and located in the first cell, to the controller, wherein the fault detection circuit is responsive to the receiver to generate the fault signal.

The variable power transmitter may be a sectorised transmitter having a plurality of transmitter sections, with each transmitter section arranged to transmit to a predefined portion of the cell; wherein, in response to a fault signal generated by a fault detection circuit associated with a first cell, the controller instructs a sectorized transmitter section, located in an adjacent sector of at least one adjacent cell, to increase its output power, thereby extending its coverage range and providing, at least in part, communications coverage to the cell suffering failure.

The first transmitter may comprise means for monitoring its transmitted output power and means for generating the fault signal when that output power changes from an expected power.

In a further aspect of the invention, the communications system may be a time division multiplex (TDM) communications system, wherein a controller controls a second transmitter to transmit in a first mode at a first set of output powers and, in response to a fault signal, in a second mode at a second increased set of output powers, and controls the second transmitter to change between said modes on a slot-by-slot basis, such as to provide communications coverage to a cell or sector in which a fault has occurred.

Am exemplary embodiment will now be described with reference to the accompanying drawings.

DETAILED DESCRIPTION OF A PREFERRED EMBODIMENT

Figure 1:
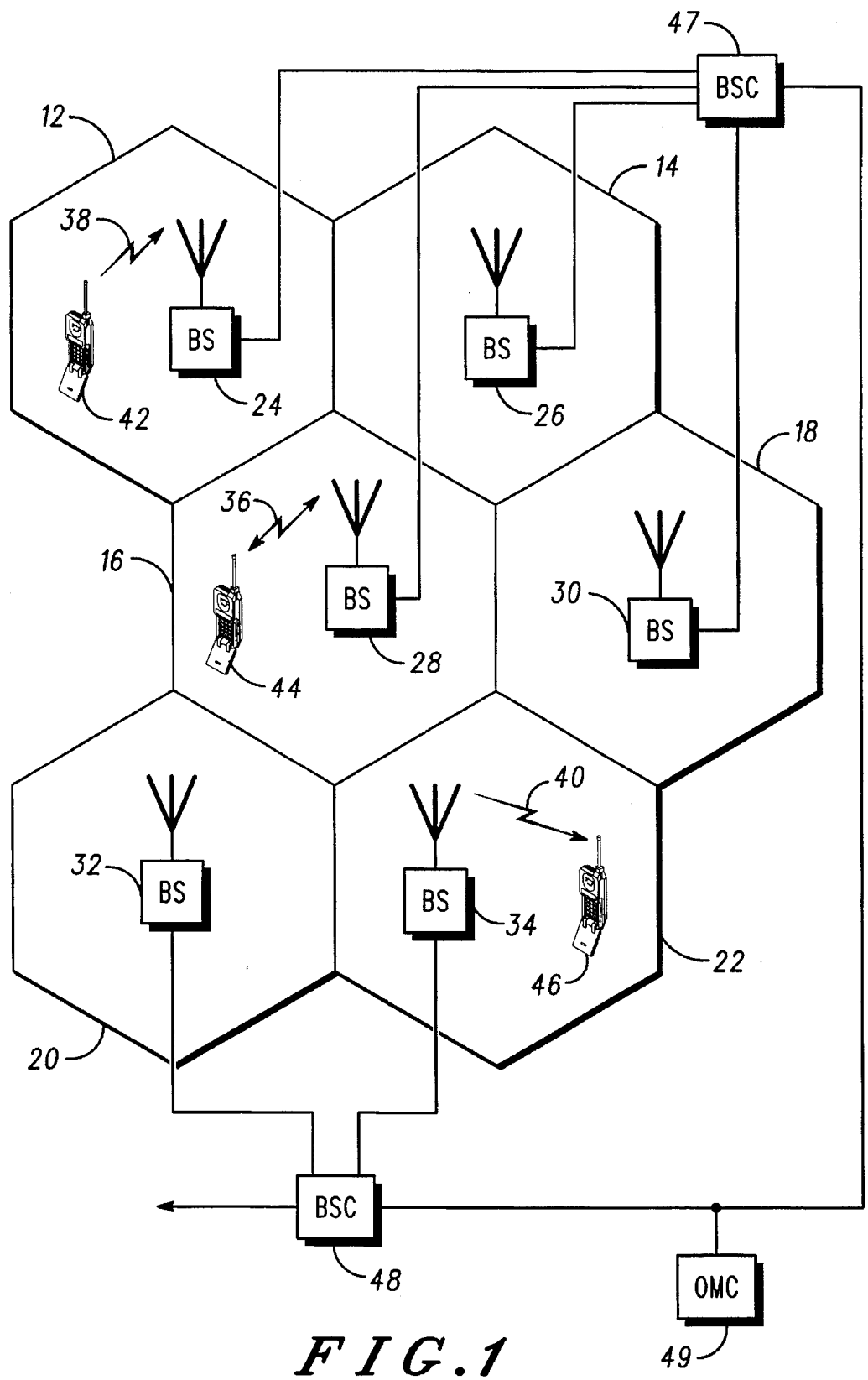
FIG. 1 illustrates a typical cellular communications system.

FIG. 1 illustrates a typical communications system 10 having a coverage area formed by a number of interconnected coverage cells 12–22. A conventional hexagonal cell pattern has been used to depict the coverage area. At substantially the centre of each coverage cell 12–22, there is located a base station 24–34 which controls communications traffic 36 in its cell in accordance with procedures known to one skilled in the art. Each base station 24–34 may receive 38 and transmit 40 signals from/to mobile communications devices 42–46 that roam throughout the communication system 10. Each base station (BS) 24–34 is coupled to an operations and maintenance centre (OMC) 49, responsible for overall system control, through a base station controller (BSC) 47, 48. It will be appreciated that a base station controller (BSC) 47, 48 may be coupled to one or more base stations 24–34 for the control thereof, and the OMC 49 may be either on a regional or system basis, subject to the size of the communications system.

The range of a base station in, for example, a cellular communications system, is determined by several factors, such as transmitter power, antenna type, antenna height, terrain and propagation conditions. Many cellular systems have the ability to control their transmission (Tx) output power. The Tx output power is usually restricted to a level such that a minimum Tx power level is required to acquire a good quality link between the base station and a mobile with which it is communicating. By limiting the transmitter power output, there is a reduction in adjacent channel splatter and minimization of interference between that base station and any other base station in the same system operating at the same radio frequency.

Figure 2:
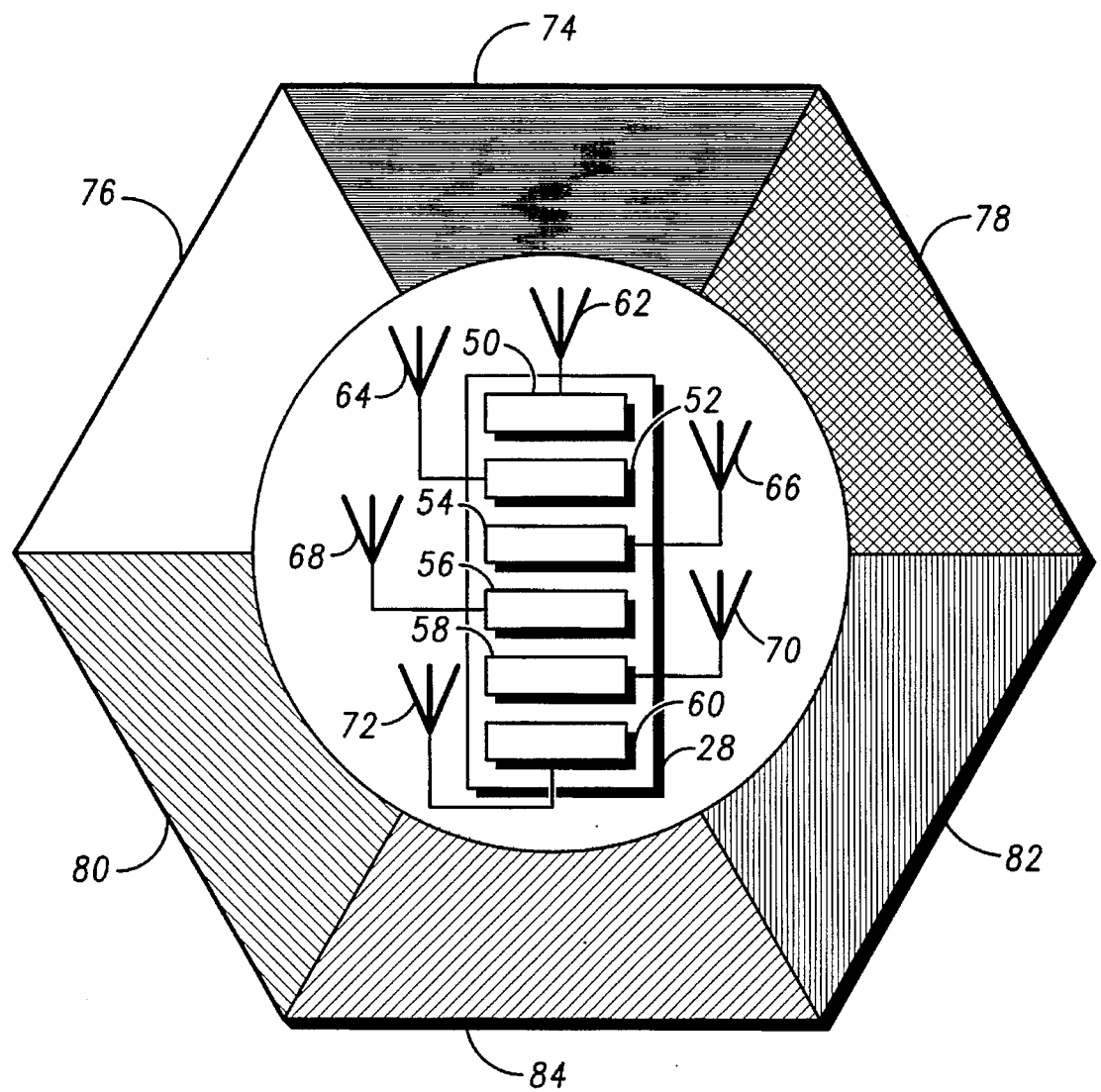
FIG. 2 shows a prior art sectorized cell.

FIG. 2 shows a sectorized cell, such as cell 16 of FIG. 1, having a base station 28 that comprises six radio channel units (RCUs) 50–60, each having associated transmit and receive antennae 62–72 respectively. The cell is sectorized in as much as each RCU 50–60, and its corresponding antennae 62–72, serves a predefined sector 74–84, typically covering a 60 degree arc of the cell 16, as described in UK patent application No. 9220823.0 assigned to Motorola Limited and incorporated herein by reference. Each sector 74–84 typically operates with a combination of different frequencies and/or timeslots from any other adjacent cell, thereby minimising communications interference between adjacent sector and adjacent cells. The base station 28 typically comprises eight RCUs; with the unassigned RCU's acting as a back-up in case of sectorised RCU failure. Each cell in the communication system 10 has a substantially identical structure and, as such, no further explanation is necessary.

Figure 3:
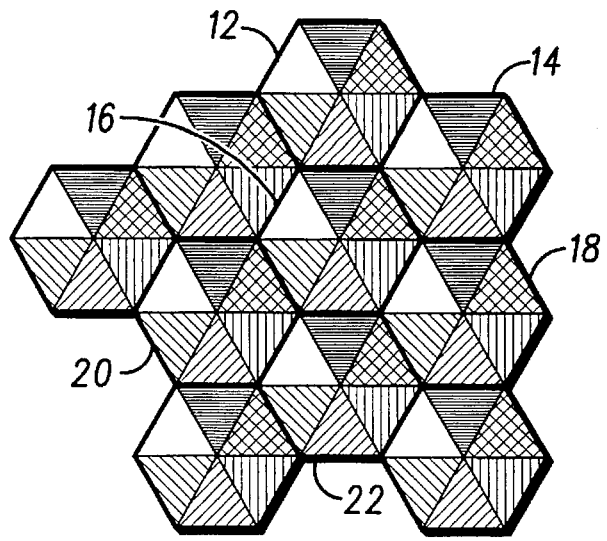
FIG. 3 shows a prior art sectorized cell coverage for the communications system of FIG. 1.

FIG. 3 shows a re-use pattern for cells of the communications system of FIG. 1, wherein each cell is sectorized. As can be seen, the sectors 74–84 of cell 16 are replicated in each other cell, wherein common sectors share the same coded pattern.

Figure 4:
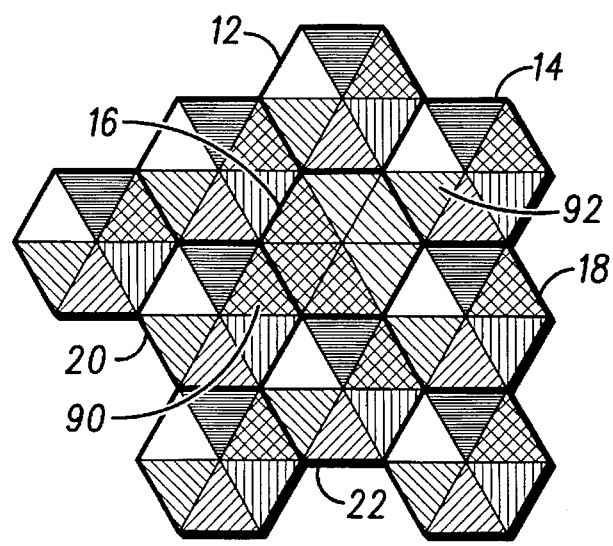
FIG. 4 shows redistribution of a failed cell's coverage area between adjacent cells in accordance with a preferred embodiment of the present invention.

With regard to FIG. 4, the communications system 10 of FIG. 1 has suffered a system failure in cell 16. More particularly either the entire base station 28 (or the power supply to it), or one of the RCUs 62–72 located therein, has failed; resulting in a loss of service in the cell. In accordance with a preferred embodiment of the present invention, there is provided a mechanism that indicates to a base station controller that such a failure has occurred, whereby output power from one or more adjacent sectorized transmitters is increased to provide service to mobiles located within the normal coverage of cell 16. Therefore, in the preferred embodiment, the provision of redundant RCUs may be eliminated. More specifically, the OMC has instructed, through a base station controller, the base stations 26, 32 of cells 14 and 20 to increase the power transmitted from RCUs controlling sectors adjacent to cell 16, thereby filling the gap in coverage left by the failure of cell 16. In the instant example, an RCU controlling sectorized portion 90 of cell 20 has boosted its output power. Similarly, the RCU controlling sectorised portion 92 of cell 14 has boosted its output power. As will be appreciated, this is only one possible combination of many, using the sectors of cells adjacent to cell 16. For example, each cell adjacent to the failed cell may boost the output power of a suitable RCU. Furthermore, an RCU in an adjacent cell may adjust its output power to limit a range of transmission therefrom, e.g. to a region beyond a centre of the failed cell. It will be appreciated that the increase in output power is limited by the power of the RCU but will typically provide a coverage radius of between 2.5 km (kilometres) and 35 km.

Figure 5:
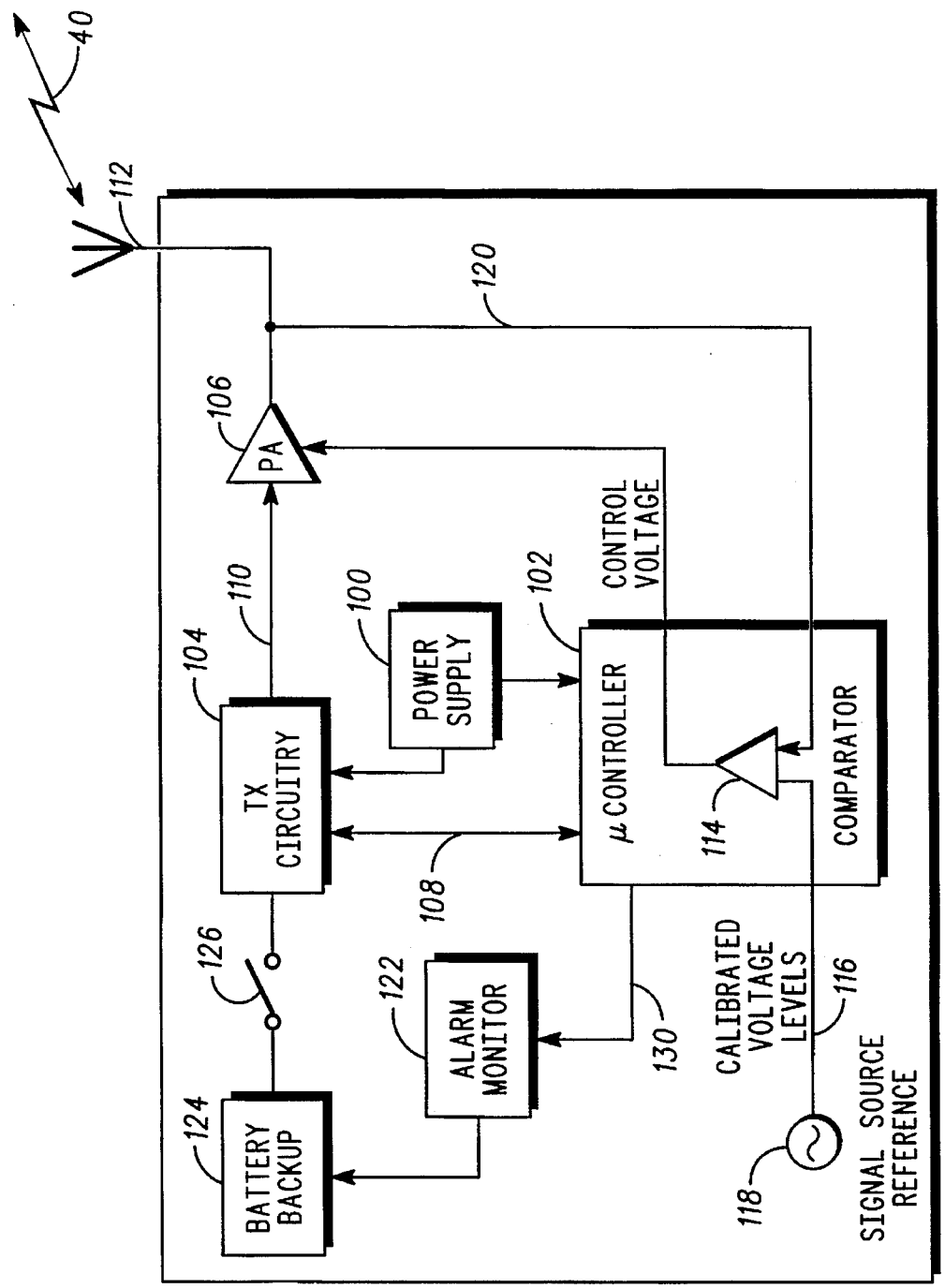
FIG. 5 shows a detection circuit, suitable for implementation in a base station, for detecting output power failure.

FIG. 5 illustrates a hardware configuration of a detection circuit suitable for indicating a failure of either an entire base station or an RCU inside a base station. A power supply 100 supplies power to a detector unit 102, as illustrated by the coupling of the power supply 100 to a microcontroller 102, and transmission circuitry 104 of the base station or RCU. The transmission circuitry 104 is responsive to a control voltage 108 generated from the microcontroller 102. A power amplifier 106 is coupled to an output of the transmitter circuitry 104 and amplifies a signal 110 generated therefrom to a power level suitable for transmission 40 through an antenna 112. A comparator circuit 114 inside the microcontroller 102 compares a calibrated voltage level 116, generated from a signal source 118, with a sampled output 120 generated from the power amplifier 106. The comparator 114 regulates the power amplifier 106 through use of the control voltage 108, as will be appreciated by one skilled in the art. The voltage source 118 provides a very accurate reference. The detection circuit further comprises an alarm monitor 122 responsive to the microcontroller 102. A battery back-up 124 is coupled to the alarm circuit 122 and provides an alternative power supply in the event of failure of the RCU or base station. The battery back-up 122 is coupled through a switch 126 to the transmitter circuitry 104.

In the event of RCU or base station failure, the output of the power amplifier 106 varies from an expected power level generated from the signal source 118. This variation causes the RCU or base station to generate an alarm signal 130 and therefore trigger the alarm monitor 122. The RCU or base station subsequently reports that a failure has occurred to the OMC 49. Clearly, this detection circuit acts as a self monitoring system and reports failure to the OMC. More particularly, the alarm monitor 122 ensures that a fault is reported to the base station controller 47, 48 and ultimately the OMC 49 in the event of power failure of RCU or base station, i.e. it provides a second layer of battery protection.

Instead of measuring the base station's own transmit power, a base station diagnostic subsystem receiver can be used to measure receive level or receive quality of an adjacent base station. Alternatively, a mobile (communications device) unit can measure receive level or receive quality from the base station and report these values to the base station, from which the base station can determine that a fault exists, e.g. from a substantial drop in receive level being reported by all the mobiles in the cell or cell sector. Again, the OMC 49 can boost the power of a suitable adjacent antenna and therefore provide coverage to the failed cell or sector.

A more detailed circuit diagram representative of the hardware requirement of FIG. 5, can be found in European patent application EP-A-0,412,392 assigned to Motorola Limited and incorporated herein by reference.

An additional feature of the present invention relates to its implementation in a time division multiple access (TDMA) system, such as the pan-European GSM cellular communications system. Provided that cell 16 was only lightly loaded with communications traffic before its failure, i.e. not all of its time slots were allocated, the power transmitted from adjacent sectorized RCUs in cells 14 and 20 could be controlled on a time slot basis, whereby cells 14 and 20 would only transmit at higher power levels for mobile communications devices in a failed neighbour, at the appropriate time slots. In all other time slots, cells 14 and 20 would operate at lower power levels and only serve mobile communications devices in their own coverage cells.

Figure 6A:
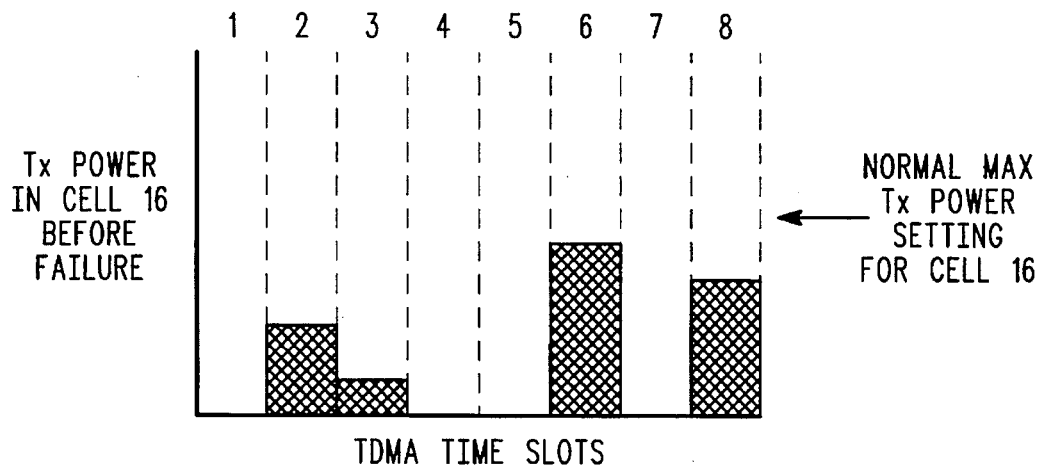
FIGS. 6a–6c show comparisons between radiated power per TDMA time slot for adjacent cells of FIGS. 3 and 4.
Figure 6B:
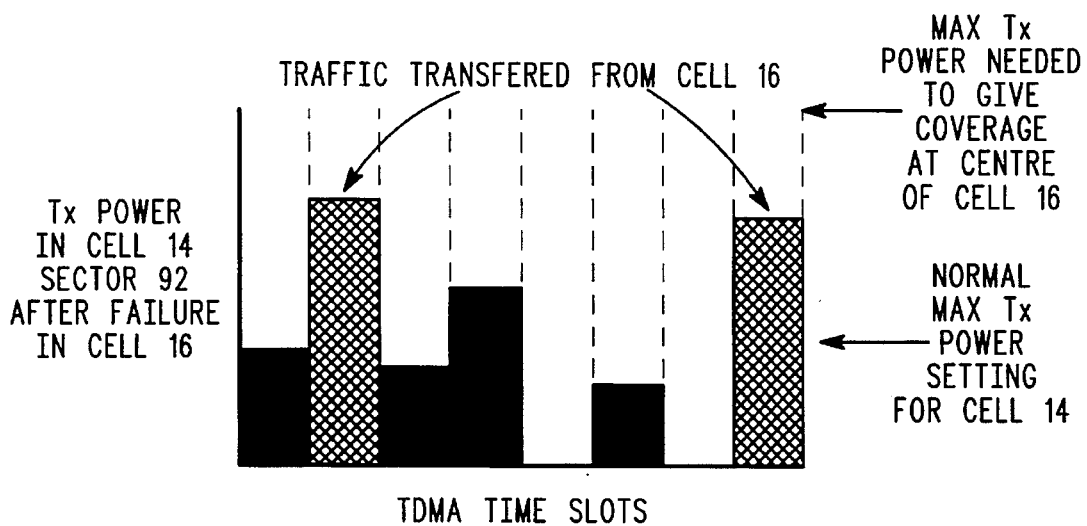
Figure 6C:
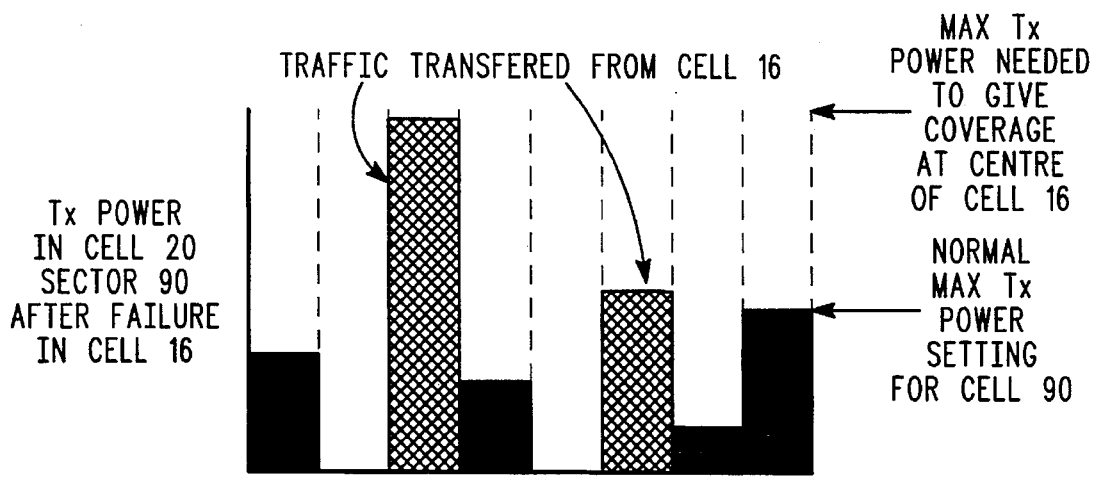

This is illustrated, by way of example, with reference to FIGS. 6a–6c in which the additional traffic loading of cells 14 and 20 has meant that there has been an increase in transmitter output power during time slots 2, 3, 6 and 8. The control of transmitter power on a time slot basis has the advantage that interference between the transmitter providing extended coverage and transmitters in adjacent cells using the same radio frequency is kept to a minimum.

The use of controlled power transmission on a time slot basis is only applicable to cells that are lightly loaded with communications traffic. In the event that the cell is fully loaded, coverage would need to be provided in all of the time slots which would mean that an adjacent transmitter (base station RCU) would need to transmit at a higher power for the entire period of time.

In summary, the present invention provides a mechanism through which a base station controller (BSC) and ultimately the OMC, is informed that a base station or sectorised RCU has failed. In such an event, the OMC can take action in order to provide communications coverage to the cell affected by the failure. More specifically, the output power of adjacent sectors or cells can be increased to provide a service to those mobiles located within a sector affected by the failure, i.e. transmitters in either adjacent sectors or cells can extend their coverage range beyond their normal boundaries in order to provide service to mobile communications devices lying outside their defined coverage cells.

An invention so designed and described produces the novel advantages of a communications system having an operating methodology that can mitigate the affects of cell or sectorised failure. Furthermore, there is an increase in system reliability in association with a redundancy in infrastructure required to implement the invention. Moreover, the reduction in infrastructure gives rise to the benefit of reduced costs for communication system operators.

It will be understood that the above description has been given by way of example only and that modifications in detail, such as omnicell transmission with sectorised reception, may be made within the scope of the invention. In addition, the concept of boosting adjacent transmissions to serve a coverage cell of a failed base station is applicable to other communications system, such as a PCN (Personal Communication Network) system or the European Railways (U.I.C) system and, as such, the cell pattern should be considered to represent such alternative communications systems.

We claim:

1. A communications system for communications coverage over a coverage area comprising a plurality of interconnected cells, the system comprising:

a) a controller;

b) a first transmitter for transmitting information into a first cell in response to the controller; and c) a fault detection circuit, responsive to the first transmitter and coupled to the controller, for detecting a fault in the first transmitter and for generating a fault signal, in response to the detection of a fault, that indicates that the cell has suffered failure in communications coverage;

wherein the controller, in response to said fault signal generated by said fault detection circuit associated with the first cell, instructs a variable power second transmitter located in an adjacent cell to increase its output power, thereby extending its coverage range and providing, at least in part, communications coverage to the cell suffering failure.

2. A communications system as claimed in claim 1, further comprising a receiver, coupled to the controller, for relaying communications signals from a communications device, responsive to said information and located in the first cell, to the controller, wherein the fault detection circuit is responsive to the receiver to generate the fault signal.

3. A communications system as claimed in claim 1, wherein the variable power second transmitter is a sectorised transmitter having a plurality of transmitter sections, with each transmitter section arranged to transmit to a predefined portion of the cell; wherein, in response to said fault signal generated by the fault detection circuit associated with the first cell, the controller instructs one of the plurality of sectorized transmitter sections, located in the adjacent sector of the adjacent cell, to increase its output power, thereby extending its coverage range and providing, at least in part, communications coverage to the cell suffering failure.

4. A communications system as claimed in claim 1, wherein the first transmitter comprises means for monitoring its transmitted output power and means for generating the fault signal when that output power changes from an expected power.

5. A communications system as claimed in claim 1, a is time division multiplex communications system.

6. A time division multiplex communications system as claimed in claim 5, wherein the controller controls the second transmitter to transmit in a first mode at a first set of output powers and, in response to said fault signal, in a second mode at a second increased set of output powers, and to change between said modes on a slot-by-slot basis.

7. A communications system as claimed in claim 1, wherein said fault detection circuit resides in either said first transmitter or a transmitter located in an adjacent base station.

* * * * *